E. MORGAN.
Corn-Planter.
No. 168,046. Patented Sept. 21, 1875.
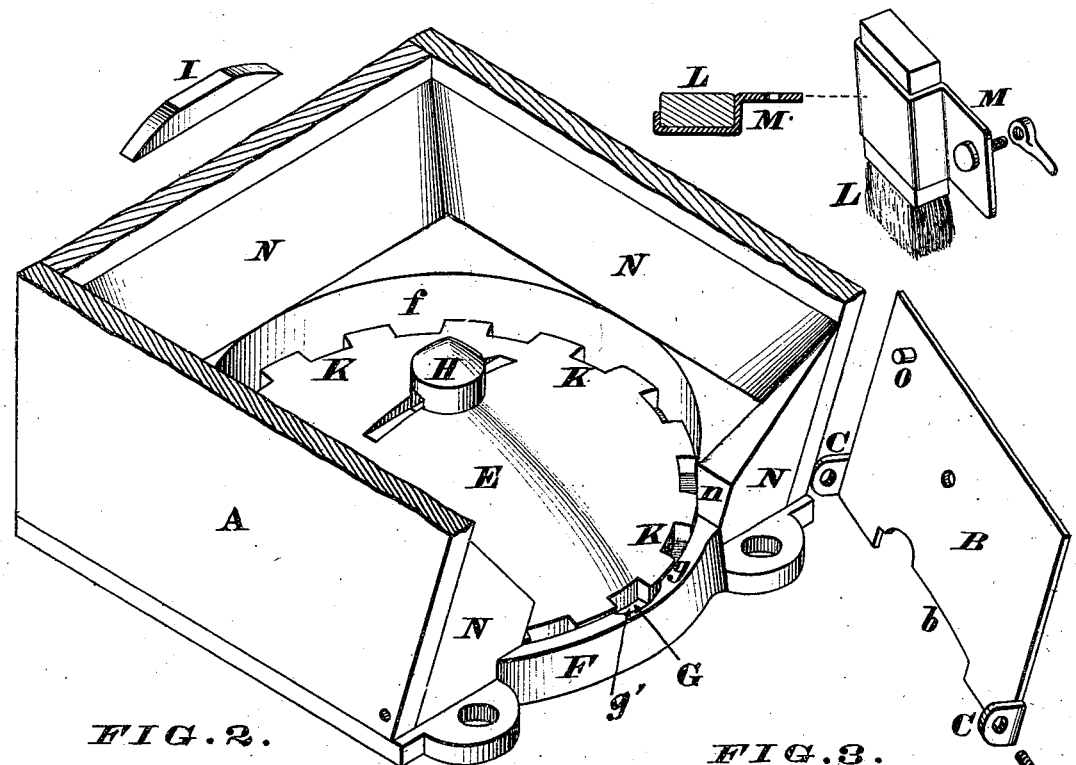
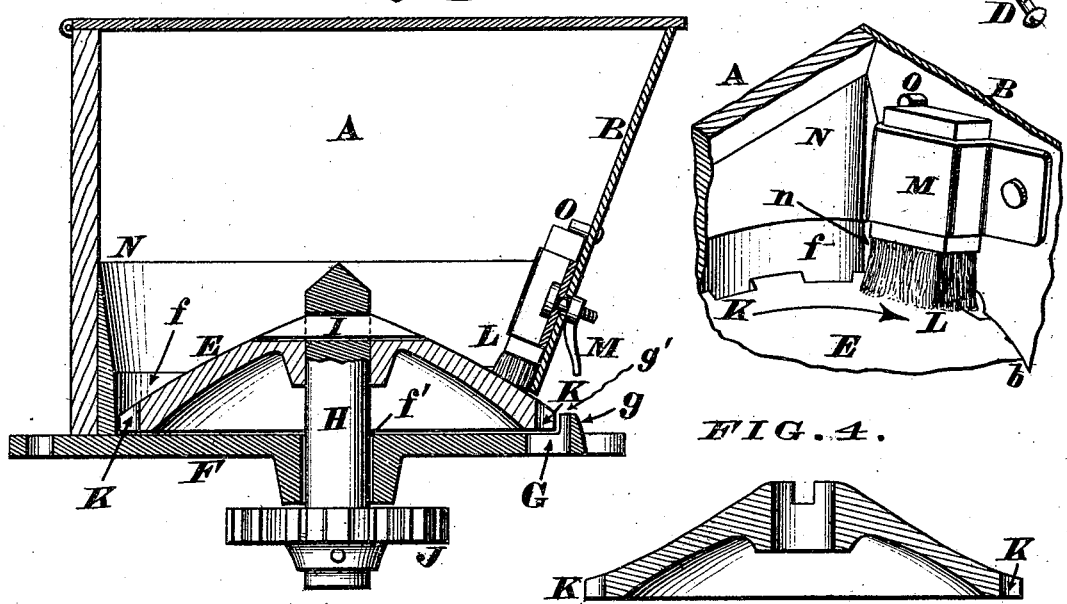

UNITED STATES PATENT OFFICE.

EDMOND MORGAN, OF DUBLIN, INDIANA, ASSIGNOR TO HIMSELF AND L. LOVELL LAWRENCE, OF SAME PLACE.

IMPROVEMENT IN CORN-PLANTERS.

Specification forming part of Letters Patent No. 168,046, dated September 21, 1875; application filed May 7, 1875.

*To all whom it may concern:*

Be it known that I, EDMOND MORGAN, of Dublin, Wayne county, Indiana, have invented a new and useful Improvement in Corn-Planters, of which the following is a specification:

My invention relates to an improved form of dropper or grain-delivering disk for corn drills or planters.

In the accompanying drawing, Figure 1 is a perspective view, showing the dropper-disk in position within the hopper, the retaining-key, the cut-off brush, and the back plate of the hopper being shown detached. Fig. 2 is a vertical section through the hopper from front to rear of the same in the plane of the dropper-disk shaft. Fig. 3 is a perspective view of one of the inner angles of the hopper with the cut-off brush in position. Fig. 4 is a vertical section, showing a modification of the dropper-disk. Fig. 5 is a plan, showing two different forms of notches for the dropper-disk.

My grain-box or hopper A may be rectangular in horizontal section, as represented, its front and side walls vertical and of wood, and its rear wall sloping upward and rearward, and consisting of an iron plate, B, whose flanges or lugs C engage outside of the side walls, to which they are secured by means of wood-screws D. The plate B has in its under side a notch, b, for the protrusion of a portion of the dropper-disk E with its charges of grain. The said disk occupies a circular depression, f, in the bottom F of the hopper, and its shaft H occupies an orifice, f', in said hopper-bottom. Converging corner-pieces N assist in conducting grain to the cone, and a notch, n, in one of them serves as abutment to hold the brush to its work. A portion, F', of the said bottom protrudes in rear of the hopper-back, which rises vertically from the said protruding portion F' of the hopper-bottom, has a grain-passage, G, which may discharge into any suitable grain-conducting tube or spout. The dimensions and position of the orifice G and a cove, g', in the inner wall of curb g enable the husbandman to watch the operation of the dropper, and to assure himself that each pocket as it comes around is charged with its proper grain, and that said grain actually descends through said orifice G. The curb g also serves to prevent the escape of grain otherwise than through said orifice G, while the cove g' acts to relieve and loosen the grain, and to insure its escape into the delivery-spout. My grain-delivering disk or dropper E has the form of an obtuse hollow cone, as represented, having an axial orifice which receives the shaft H, whose portion which enters the said orifice may be circular, and the corotation of shaft and cone be secured by a key, I, which traverses both; or both shaft and orifice may have a square or any other corresponding non-circular form, in which case the only duty of the key I will be to hold the cone upon the shaft. The lower end of shaft H has a worm-wheel, J, or other geared connection with the ground-wheel. The periphery of the cone has a series of equidistant notches, K, of such shape and dimensions as to receive and hold each one a grain of corn standing edgewise. Other disks to be furnished with the planter have their notches of such size and shape as to take each one or more beans, peas, cotton-seed, or other grain. L is my cut-off brush, secured to the inner side of the rear plate B by means of a screw-clamp, M, at such an angle of presentation as to press its receiving-edge firmly upon the top of the cone. A shallow curb, g, prevents the escape of grains otherwhere than down the orifice G without obstructing the view of the quantums of grain as they make their appearance outside of the hopper.

Should it be desired to substitute a dropper of different-sized or less or more numerous notches, the user has but to withdraw the key I from the slotted shaft H, and slip the cone off, substituting one of the form required.

The above apparatus is believed to be particularly well adapted for planting in drills. The top of shaft H may be screw-threaded, and receive a nut instead of the key I.

The notches or receptacles K being of such size and shape as to take each one a single grain and no more in the edgewise or vertical position, one grain and no more is insured for each dropping, the position of the grain in the receptacle making it impossible either that another should enter or that the one already pocketed should become swept out again by the cut-off brush.

I claim as my invention—

In combination with the notched hopper-back B b, the conical revolving dropper-disk E, seated in a circular depression of the bottom F, and having peripheral indentations K corresponding to the size of the grain on edge, a portion of said notched disk E and of said bottom F protruding in rear of the hopper, said bottom protrusion F' having the orifice G and shallow peripheral curb g g', to insure and enable observation of the grain dropping, as and for the purpose set forth.

In testimony of which invention I hereunto set my hand.

EDMOND MORGAN.

Attest:
   GEO. H. KNIGHT,
   JOHN W. SCOTT.